United States Patent [19]
Yoshitake et al.

[11] Patent Number: 5,546,501
[45] Date of Patent: Aug. 13, 1996

[54] DEFUZZIFICATION SYSTEM FOR SHIFTING AND SCALING CENTROID VALUES

[75] Inventors: Akio Yoshitake; Masanari Oh, both of Fukuoka, Japan

[73] Assignee: Rohm Co., Ltd., Kyoto, Japan

[21] Appl. No.: 86,039

[22] Filed: Jul. 6, 1993

[30] Foreign Application Priority Data

Jul. 10, 1992 [JP] Japan ................... 4-184139

[51] Int. Cl.$^6$ .................................................. G06F 15/00
[52] U.S. Cl. ................................ 395/3; 395/51; 395/900
[58] Field of Search .......................... 395/3, 51, 12, 395/900

[56] References Cited

U.S. PATENT DOCUMENTS

| | | | |
|---|---|---|---|
| 4,837,725 | 6/1989 | Yamakawa | 395/3 |
| 5,073,863 | 12/1991 | Zhang | 395/3 |
| 5,202,954 | 4/1993 | Miyazawa et al. | 395/3 |

OTHER PUBLICATIONS

Single Board For Fuzzy Inference, James R. Symon, Hiroyuki Watanable, Feb. 28, 1991.
Peters et al. "Fuzzy Logic Controller with Dynamic Rule Set" IEEE, 11–13 Aug. 1992.
Yamamoto, "A meaningful Infinite–Valued Switching function" IEEE, 27–29 May 1992.

*Primary Examiner*—Allen R. MacDonald
*Assistant Examiner*—Richemond Dorvil
*Attorney, Agent, or Firm*—Oliff & Berridge

[57] ABSTRACT

In a defuzzification system having fuzzy singletons in the consequent, an inference block (1) in each rule includes a device (2) for calculating the maximum value of each fuzzy singleton, devices (3 and 4) for performing weighted and simple additions to each of the inference grades outputted from the maximum value calculating device, a device (5) (11) for dividing the weighted addition value by the simple addition value to provide a centroid value and devices (6 and 7) (12 and 13) for expanding and contracting and/or shifting the output range width of the quotient from the dividing device. Even if the input range width of the subsequent circuits and devices varies, the output range width of the centroid value can be scaled by a scaling device and also shifted by a level shifting device. The same arrangement can change and regulate the scaling or controlled variable of the consequent depending on the purpose of control.

6 Claims, 3 Drawing Sheets

DEFUZZIFICATION SYSTEM FOR SHIFTING AND SCALING CENTROID VALUES

BACKGROUND OF THE INVENTION

1. Field of the Invention

The present invention relates to a system for removing ambiguity from ambiguous information and knowledge of control, pattern recognition, decision making and so on. Particularly, the present invention concerns a defuzzification system comprising a consequent defined by fuzzy singletons, the range width and shift of a centroid value being variable depending on the purpose of control.

2. Description of the Related Art

FIG. 3 schematically illustrates a simplified fuzzy inference system having a consequent defined by fuzzy singletons. In general, the fuzzy inference uses a rule of inference which is described by a so-called "IF-THEN rule". The "IF" part is called the "antecedent" while the "THEN" part is called the "consequent". In the fuzzy inference, the descriptions other than "IF" and "THEN" parts are expressed, as a fuzzy set, by the membership characteristic function to provide an inference on ambiguous knowledge.

When the fuzzy set in the descriptions other than the "consequent" part is replaced by fuzzy singletons, it is called a "simplified process". Such a "simplified process" is increasingly being used in various fields including control and so on since the number of calculation steps are greatly reduced.

The algorithm in the simplified fuzzy process will be described with reference to FIG. 3. When an element x is inputted into the system, the operational result due to the membership characteristic function described in the antecedent is calculated for each rule. The calculated value is called "degree of satisfaction" from which an inferential result for that rule is determined in the inputted element x. Since the consequent in the simplified process is defined by fuzzy singletons, the degree of satisfaction itself in the antecedent directly becomes the grade of the inferential result.

Subsequently, the grades determined from a plurality of rules are unified, for example, by MAX (maximum) operation. In many realistic cases, it is required to output a single decided value from the unified inferential result. Such an operation is called "defuzzification" and is generally carried out by determining the weighted average of the unified inferential result or center of gravity. The calculation is represented by the following equation:

$$V_O = \sum_{i=1}^{n} W_i \cdot \mu_i / \sum_{i=1}^{n} \mu_i \tag{1}$$

where i represents each of the singletons defining the consequent; n is the total number of fuzzy singletons; $W_i$ expresses the element of each fuzzy singleton; and $\mu_i$ is the grade of each fuzzy singleton. The numerator in the equation (1) is the weight adding value of each inferential grade while the denominator is a simple adding value. The centroid value thus determined is a decided output in the fuzzy inference.

If the fuzzy inference is defined by hardware, the range width and value of an input to a subsequent device depends on the subsequent circuit and device. Therefore, it may be required that the output range width of the centroid value is expanded and contracted and also that the output of the centroid value is shifted.

In the fuzzy control, it is further required to determine the output range width of the consequent into a proper width. If the output range width of the consequent is larger than the proper width, the sensitivity of the system to variations in input is increased, but an over-operation may be raised. If the output range width of the consequent is smaller than the proper width, the system is not sensitive to variations in input, but the amount of operation decreases to avoid the over-operation.

It is therefore required that the output range width of the consequent can be expanded or contracted to meet an object or purpose to be controlled.

It is therefore an object of the present invention to provide simplified fuzzy inference hardware comprising means for varying the output range width of the centroid value and shifting the centroid value depending on the input range width from subsequent circuits and devices and means for varying the scaling or controlled variable of the consequent depending on the purpose of fuzzy control.

SUMMARY OF THE INVENTION

To this end, the present invention provides a defuzzification system comprising a plurality of rules, each rule for a consequent being defined by a fuzzy singleton, means for calculating the maximum value of membership characteristic function for each fuzzy singleton, means for calculating an inference grade of each of said fuzzy singletons from the maximum value from said maximum value calculating means, means for performing a weighted addition between the inference grades and the membership characteristic function values, means for performing a simple addition of said inference grades, means for dividing said weighted addition value by said simple addition value to determine a centroid value, and means for scaling the centroid value into a value having a predetermined range width and/or means for shifting the centroid value by a predetermined value.

In such an arrangement, the output range width of the centroid value can be expanded and contracted and/or shifted. The present invention has the following advantages:

(1) Even if the input range width of the subsequent circuits and devices varies, the output range width of the centroid value can be scaled by scaling means and also shifted by level shifting means.

(2) The same arrangement can change and regulate the scaling or controlled variable of the consequent depending on the purpose of control.

DETAILED DESCRIPTION OF THE PREFERRED EMBODIMENT

Figure 1:
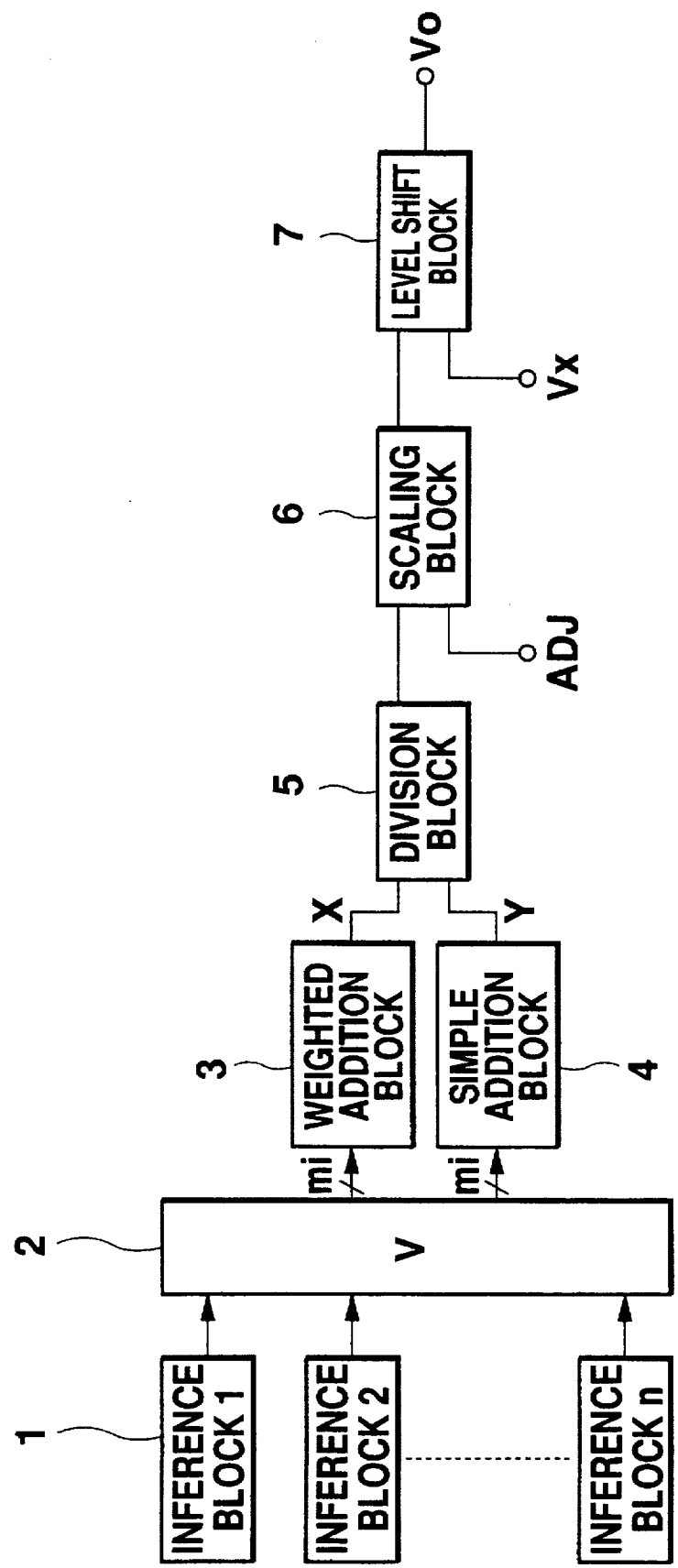
FIG. 1 a block diagram of one embodiment of defuzzification hardware constructed in accordance with the present invention.

Referring to FIG. 1, there is shown one embodiment of defuzzificaiton hardware constructed in accordance with the present invention. The defuzzification hardware comprises a plurality of inference blocks 1 . . . n each having a rule, the consequents of these rules being defined by a fuzzy singleton. The outputs of the inference blocks are supplied to a maximum value calculating block 2 wherein they are unified into an inference grade for each fuzzy singleton in the consequents of the respective rules. The unified inference grade for each fuzzy singleton is represented by $\mu_i$ wherein i is the fuzzy singleton number. This value of $\mu_i$ is then inputted into a weighted addition block 3 and a simple addition block 4 which respectively output:

$$X = \sum_{i=1}^{n} W_i \cdot \mu_i \quad (2)$$

$$Y = \sum_{i=1}^{n} \mu_i \quad (3)$$

A division block 5 provides a quotient $V_O$ from the above equation:

$$V_O = X/Y = \sum_{i=1}^{n} W_i \cdot \mu_i / \sum_{i=1}^{n} \mu_i \quad (4)$$

On the other hand, a scaling block 6 receives a suitable scaling value ADJ from any suitable external means. The equation (4) is multiplied by the ADJ value:

$$V_O = (X/Y) \times ADJ \quad (5)$$

$$= \left( \sum_{i=1}^{n} W_i \cdot \mu_i / \sum_{i=1}^{n} \mu_i \right) \times ADJ$$

A level shift block 7 receives a suitable level shifting voltage $V_x$ from any suitable external means. The equation (5) is multiplied by the value $V_x$ to provide a final decided output voltage $V_O$:

$$V_O = ((X/Y) \times ADJ) + V_x \quad (6)$$

$$= \left( \left( \sum_{i=1}^{n} W_i \cdot \mu_i / \sum_{i=1}^{n} \mu_i \right) \times ADJ \right) + V_x$$

Figure 2:
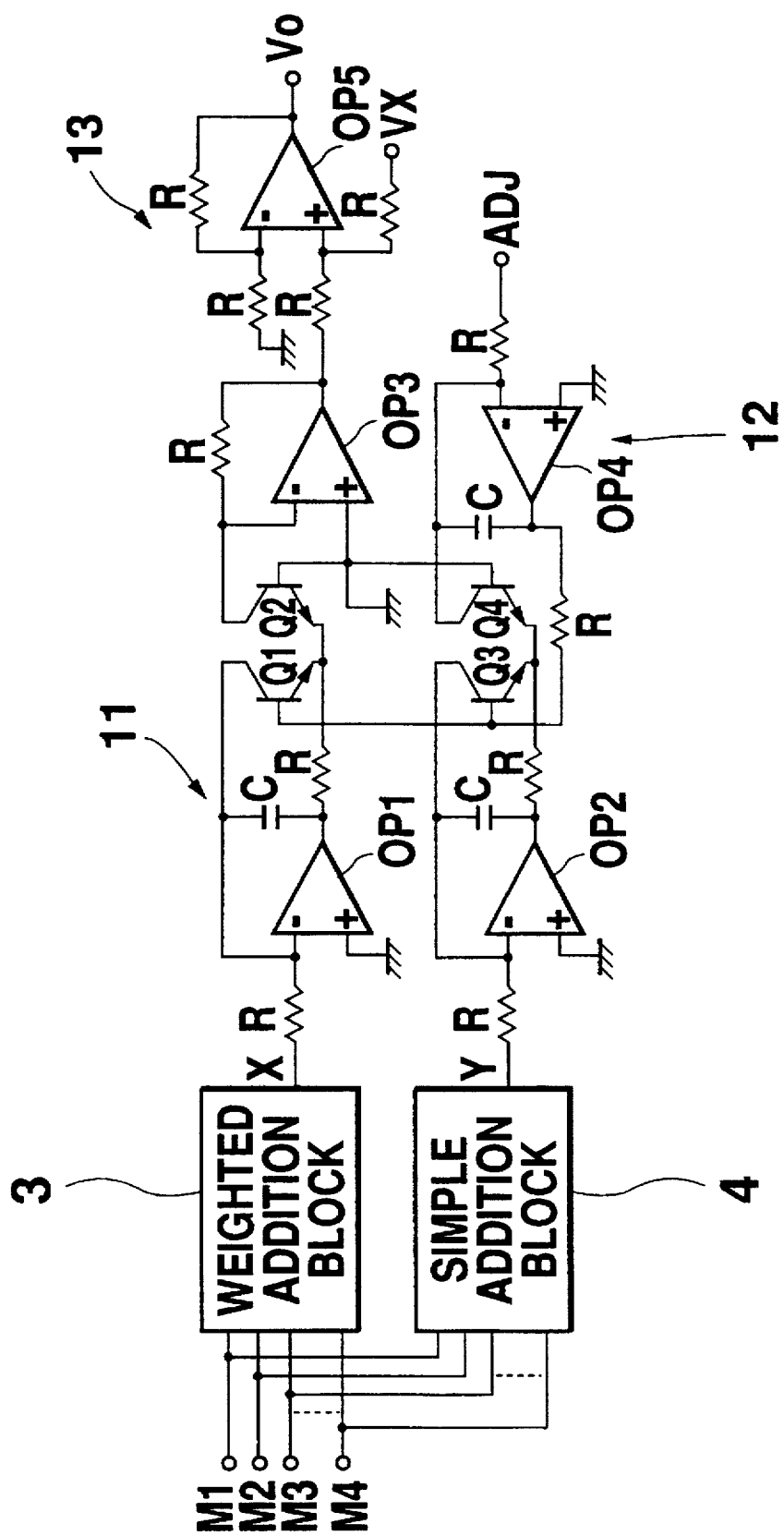
FIG. 2 is a circuit diagram of an electrical analog circuit to which the defuzzification hardware of the present invention is applied.
Figure 3:
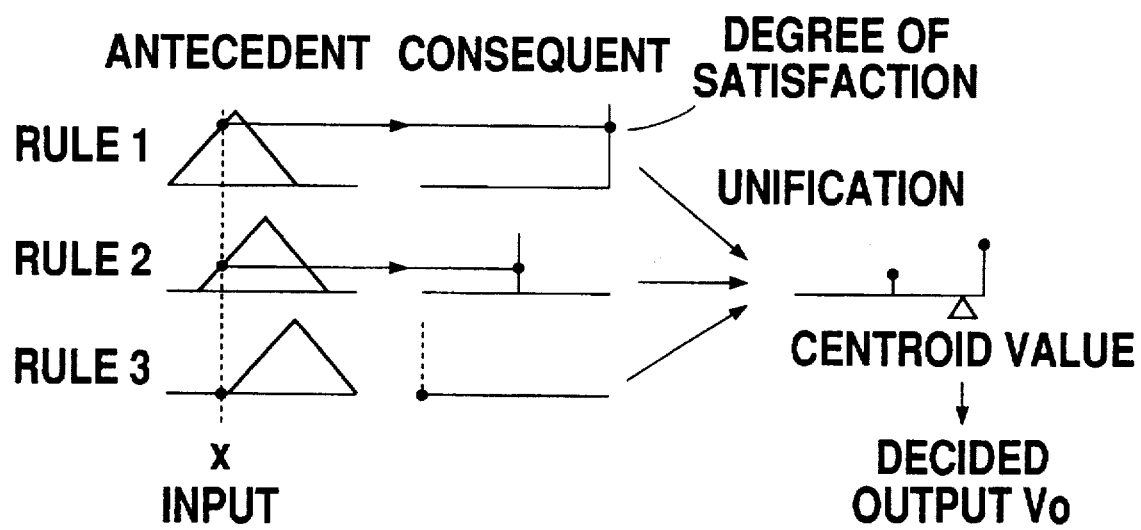
FIG. 3 is a schematic view illustrating a simplified fuzzy inference according to the prior art.

Referring to FIG. 2, there is shown an electrical analog circuit to which the defuzzification hardware of the present invention is applied. The division, scaling, level shift blocks (5, 6 and 7) shown in FIG. 1 are respectively defined by transistors Q1–Q4 and operational amplifiers OP1–OP5.

The outputs X and Y of the weighted and simple addition blocks 3 and 4 (which are standard weighted addition and simple addition circuits, respectively) are applied to a division circuit 11 which comprises the operational amplifiers OP1–OP3 and wherein the equation (4) is calculated. On application of a voltage produced by a scaling circuit 12, the equation (4) is shifted to the equation (5). This means that the range width of the decided output voltage $V_O$ is expanded or contracted by the ADJ value. On application of a voltage $V_x$ generated by the level shifting circuit 13, the equation (5) is shifted to the equation (6). This means that the range width of the decided output voltage $V_O$ is shifted by the value $V_x$.

We claim:

1. A defuzzification system for defuzzifying input signals to generate a scaled defuzzified output signal, comprising:

a plurality of inference blocks, each of the inference blocks receiving the input signals and generating a consequent defined by one of a plurality of fuzzy singletons, calculating means for calculating maximum values of a membership characteristic function for each of said plurality of fuzzy singletons, means for calculating an inference grade of each of said plurality of fuzzy singletons from the maximum values, means for performing a weighted addition between the inference grade of each of said fuzzy singletons and the maximum membership characteristic function values to obtain a weighted addition value, means for performing an addition of said inference grade of each of said plurality of fuzzy singletons to obtain an addition value, means for dividing said weighted addition value by said addition value to determine a defuzzified output signal, and means for scaling the defuzzified output signal into a value having a predetermined range width.

2. A defuzzification system for defuzzifying input signals to generate a shifted defuzzified output signal, comprising:

a plurality of inference blocks, each of the inference blocks receiving the input signals and generating a consequent defined by one of a plurality of fuzzy singletons, calculating means for calculating maximum values of a membership characteristic function for each of said plurality of fuzzy singletons, means for calculating an inference grade of each of said plurality of fuzzy singletons from the maximum values, means for performing a weighted addition between the inference grade of each of said plurality of fuzzy singletons and the maximum membership characteristic function values to obtain a weighted addition value, means for performing an addition of said inference grade of each of said fuzzy singletons to obtain an addition value, means for dividing said weighted addition value by said addition value to determine a defuzzified output signal, and means for shifting said defuzzified output signal by a predetermined value to generate the shifted defuzzified output signal.

3. A defuzzification system for defuzzifying input signals to generate a scaled and shifted defuzzified output signal, comprising:

a plurality of inference signals, each of a plurality of inference blocks receiving the input signals and generating a consequent defined by one of a plurality of fuzzy singletons, calculating means for calculating maximum values of a membership characteristic function for each of said plurality of fuzzy singletons, means for calculating an inference grade of each of said fuzzy singletons from the maximum values, means for performing a weighted addition between the inference grade of each of said plurality of fuzzy singletons and the maximum membership characteristic function values to obtain a weighted addition value, means for performing an addition of said inference grade of each of said fuzzy singletons to obtain an addition value, means for dividing said weighted addition value by said addition value to determine a defuzzified output signal, means for scaling the centroid value into a value having a predetermined range width, and means for shifting said defuzzified output signal by a predetermined value to generate the scaled and shifted defuzzified output signal.

4. A defuzzification system for defuzzifying input signals to generate a scaled defuzzified output signal, comprising:

a plurality of inference blocks receiving the input signals and generating a consequent defined by one of a plurality of fuzzy singletons, a maximum value calculating block connected to each of the plurality of inference blocks, the maximum value calculating block calculating maximum values for each of said plurality of fuzzy singletons and calculating and outputting an inference grade of each of said fuzzy singletons from the maximum values, a weighted addition block connected to outputs of the maximum value calculating block, the weighted addition block outputting a weighted addition value of the inference grade of each of said fuzzy singletons and the membership characteristic function values, an addition block connected to the outputs of the maximum value calculating block, the addition block outputting an addition value of the inference grade of each of said fuzzy singletons, a dividing circuit connected to outputs of the addition block and the weighted addition block, the dividing circuit dividing said weighted addition value by said addition value and outputting a defuzzified output signal, and a scaling circuit connected to an output of the dividing circuit, the scaling circuit scaling the defuzzified output signal and outputting the scaled defuzzified output signal having a predetermined range width.

5. A defuzzification system for defuzzifying input signals to generate a shifted defuzzified output signal, comprising:

a plurality of inference blocks receiving the input signals and generating a consequent defined by one of a plurality of fuzzy singletons, a maximum value calculating block connected to each of the plurality of inference blocks, the maximum value calculating block calculating maximum values for each of said plurality of fuzzy singletons and calculating and outputting an inference grade of each of said fuzzy singletons from the maximum values, a weighted addition block connected to outputs of the maximum value calculating block, the weighted addition block outputting a weighted addition value of the inference grade of each of said fuzzy singletons and the membership characteristic function values, an addition block connected to the outputs of the maximum value calculating block, the addition block outputting an addition value of the inference grade of each of said fuzzy singletons, a dividing circuit connected to outputs of the addition block and the weighted addition block, the dividing circuit dividing said weighted addition value by said addition value and outputting the defuzzified output signal, and a shifting circuit connected to an output of the dividing circuit, the shifting circuit shifting said defuzzified output signal by a predetermined value and outputting the shifted defuzzified output signal.

6. A defuzzification system for defuzzifying input signals to generate a defuzzified output signal, comprising:

a plurality of inference blocks receiving the input signals and generating a consequent defined by one of a plurality of fuzzy singletons, a maximum value calculating block connected to each of the plurality of inference blocks, the maximum value calculating block calculating maximum values for each of said plurality of fuzzy singletons and calculating and outputting an inference grade of each of said fuzzy singletons from the maximum values, a weighted addition block connected to outputs of the maximum value calculating block, the weighted addition block outputting a weighted addition value of the inference grade of each of said fuzzy singletons and the membership characteristic function values, an addition block connected to the outputs of the maximum value calculating block, the addition block outputting an addition value of the inference grade of each of said fuzzy singletons, a dividing circuit connected to outputs of the addition block and the weighted addition block, the dividing circuit dividing said weighted addition value by said addition value and outputting a defuzzified output signal, a scaling circuit connected to an output of the dividing circuit, the scaling circuit scaling the defuzzified output signal and outputting a scaled defuzzified output signal having a predetermined range width, and a shifting circuit connected to an output of the scaling circuit, the shifting circuit shifting said scaled centroid value by a predetermined value and outputting the scaled, shift output signal.

* * * * *